United States Patent
Zlatev et al.

(10) Patent No.: US 8,187,393 B2
(45) Date of Patent: May 29, 2012

(54) BORONIZATION PROCESS AND COMPOSITION WITH IMPROVED SURFACE CHARACTERISTICS OF METALS

(75) Inventors: Svetoslav Zlatev, Montclair, NJ (US); Roumiana Petrova, New Milford, NJ (US)

(73) Assignee: Universal Global Products, LLC, Dover, NJ (US)

( * ) Notice: Subject to any disclaimer, the term of this patent is extended or adjusted under 35 U.S.C. 154(b) by 202 days.

(21) Appl. No.: 12/472,745

(22) Filed: May 27, 2009

(65) Prior Publication Data

US 2009/0293993 A1 Dec. 3, 2009

Related U.S. Application Data

(60) Provisional application No. 61/056,541, filed on May 28, 2008.

(51) Int. Cl.
*C23C 8/68* (2006.01)
(52) U.S. Cl. .......................... 148/217; 148/279
(58) Field of Classification Search .................. 148/279, 148/217
See application file for complete search history.

(56) References Cited

U.S. PATENT DOCUMENTS

| | | | |
|---|---|---|---|
| 3,622,402 A | 11/1971 | Baranow et al. | |
| 3,673,005 A * | 6/1972 | Kunst ............................ | 148/279 |
| 3,784,402 A | 1/1974 | Reedy | |
| 3,787,223 A | 1/1974 | Reedy | |
| 3,787,245 A | 1/1974 | Kunst | |
| 4,188,242 A | 2/1980 | Scales | |
| 4,555,326 A | 11/1985 | Reid | |
| 4,957,421 A | 9/1990 | Baldi | |
| 5,518,556 A * | 5/1996 | Weber et al. ................... | 148/430 |
| 6,013,322 A | 1/2000 | Barsaum et al. | |
| 6,503,344 B2 | 1/2003 | Baudis et al. | |
| 7,264,682 B2 | 9/2007 | Chandran et al. | |

OTHER PUBLICATIONS

AISI (SAE) Steels, AISI 1018, http://www.geocities.com/haimanaua/htdocs/steels/1018, accessed Apr. 28, 2009.
Petrova, et al., Boron Coating to Combat Corrosion and Oxidation, Journal of Materials Engineering and Performance, 2005.
Jelis, Elias, et al., Boronizing of Ti-6AI-4V Eli by Powder Pack Method for Biomedical Application, 2005.
Suwattananont, et al., Oxidation Kinetics of Boronized Low Carbon Steel AISI 1018, 2005.
Petrova, et al., The Effect of Boronizing on Metallic Alloys for Automotive Applications, 2008.
Payne, et al., Residual Stress Analysis of Boronized AISI 1018 Steel by Synchrotron Radiation, Nov. 6, 2007.
Petrova, et al., The Effect of Boronizing on Metallic Alloys for Automotive Applications, 2007.
Petrova, et al., Surface Modification of Ferrous Alloys with Boron, Journal of Electronic Materials, vol. 34, No. 5, 2005.
Suwattananont, et al., Surface Treatment with Boron for Corrosion Protection, 2005.

* cited by examiner

*Primary Examiner* — Lois Zheng
(74) *Attorney, Agent, or Firm* — Michael J. Feigin, Esq.; PatentLawNY.com

(57) ABSTRACT

Embodiments of the disclosed technology provide methods of boronizing titanium and other metals and metal alloys. The method proceeds, in an embodiment of the disclosed technology, by using a boron source, and placing it in a heated environment, followed by a reduced pressure environment, as is described in the disclosure. In a solid phase embodiment of the disclosure, boronized stainless steel alloys are produced having zero galling at 17,000 psi.

16 Claims, 6 Drawing Sheets

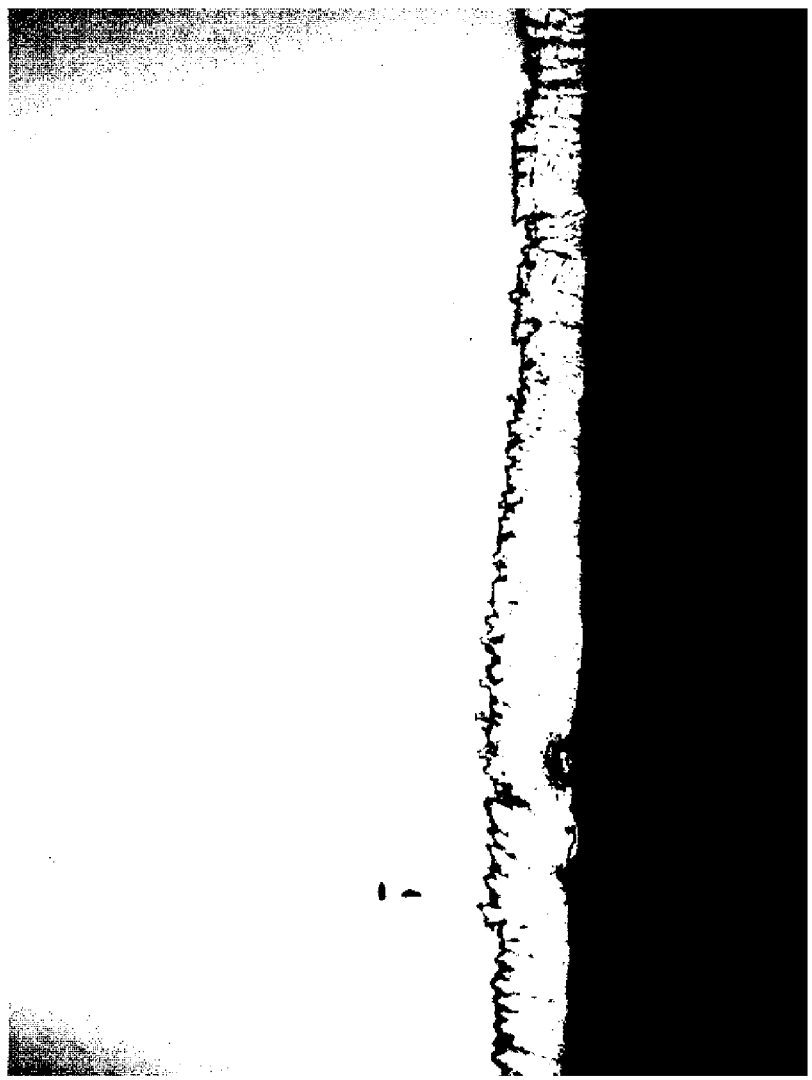

BORONIZATION PROCESS AND COMPOSITION WITH IMPROVED SURFACE CHARACTERISTICS OF METALS

THIS APPLICATION CLAIMS PRIORITY TO U.S. PROVISIONAL PATENT APPLICATION Ser. No. 61/056,541, FILED MAY 28, 2009

FIELD OF THE DISCLOSED TECHNOLOGY

The disclosed technology relates generally to boronization and, more specifically, to boronization of metals.

BACKGROUND OF THE DISCLOSED TECHNOLOGY

Boron coatings of metals enhance ability to combat wear, corrosion and oxidation even at elevated temperatures. Such coatings also provide lower friction on a substrate. Wear results from impact or surface-to-surface contact and is generally comprised of: abrasion, erosion, surface fatigue and adhesion. Abrasion is the wearing away of surfaces by rubbing, grinding and other types of friction. It generally occurs when a harder material strikes a softer material and can be caused by the scouring action of sand, gravel, slag or other gritty substances. Erosion (and cavitation) is the wearing away or destruction of metals and other materials by the abrasive action of water, steam or slurries that carry abrasive materials. Pump parts are particularly subject to erosion.

Surface fatigue is the removal of surface particles arising from cyclic stress variations and includes: pitting (formation of small sharp cavities in a surface), spalling (the spontaneous chipping, fragmentation or separation of a surface or surface coating), and impact wear (the striking of one object against another—the battering, pounding type of wear that breaks, splits or deforms metal surfaces.)

Adhesion wear is the breakdown of the bonding between contacting solid surfaces leading to material transfer between the two surfaces or loss from either surface; it includes fretting (wear between tight-fitting surfaces subjected to cyclic relative motion of extremely small amplitude), and galling (severe form of adhesive wear; scuffing and scoring are terms used to describe this surface damage under lubricated conditions.)

While boron coatings of metal substrates are known, few commercially viable methods are known for boronization, especially for titanium and titanium alloys. The currently known methods of plasma-assisted, laser, and fluidized bed reactor boronizing are inadequate to achieve the attributes necessary to make them effective for use in medical implants. Still further, methods are needed which are inexpensive to carry out and are of better quality than currently known in the art.

OBJECTS OF THE DISCLOSED TECHNOLOGY

There are numerous advantages to the proposed composition of matter and methods. The proposed method of boronization of the metallic alloys increases microhardness, wear resistance, and corrosion resistance due to diffusion coating.

The first advantage of the proposed method is the simplicity of powder pack diffusion of boron and its requirement of minimal technology as compared to the laser, plasma-assisted, and fluidized bed reactor boronizing: no special equipment is needed.

The second advantage is that the thermo-chemical treatment is combined with the diffusion process.

The third advantage of the diffusion method is its homogeneous coating, which results in superior adhesion. This superior adhesion stems from the boron atoms diffusing at the grain boundaries and allowing new phases to form. The coating will not become brittle and scratch or wear off.

The proposed diffusion method has a decreased oxidation problem as compared to the other methods, especially at higher temperatures, making it possible to use these coatings at elevated temperatures.

Overall advantages are: higher surface hardness; lower surface wear; lower surface abrasion; low-coefficient of friction of treated surface; improved corrosion and oxidation resistance; anti-galling.

SUMMARY OF THE DISCLOSED TECHNOLOGY

Embodiments of the disclosed technology include a mixture used for boronizing a metal substrate. The mixture has a boron source which may be any one of, or a combination of, boron carbide, ferroboron, amorphous boron, and the like. The boron source comprises at least 90%, by weight, of the mixture, between 1% and 3%, by weight, zirconium oxide, and between 1% and 2%, by weight, of an activator. The mixture may further contain between 3% and 5%, by weight, aluminum oxide and the activator may be potassium fluoroborate.

In an embodiment of the mixture, the boron source may be boron carbide having a weight of 92% of the mixture. The weight of aluminum oxide may be 4%, that of zirconium oxide 3%, and that of the activator 1%. Again, all weights are a proportion of the weight of the mixture. In an embodiment of the disclosed technology, the mixture may be kept above 250 degrees Celsius for a period of least two hours.

The metal substrate may be titanium, a titanium alloy, or any other compound or material with at least 50% titanium, by weight.

The boron source may be a combination of amorphous boron and boron carbide. In one such embodiment, amorphous boron is between 91% and 95% of said mixture, by weight, and boron carbide is between 2% and 7% of said mixture, by weight. In a sub-embodiment of the former embodiment, amorphous boron is 95% of the mixture, by weight, boron carbide is 4% of the mixture, by weight, and an activator is 1% of said mixture, by weight.

In a method of boronizing a metal substrate, at least one of amorphous boron or boron carbide with an activator is mixed. The mixture may be heated above 150° C. for at least two hours to purify. The metal substrate is then at least partially surrounded by the mixture and heated above 500° C. for at least two hours. Then, the mixture and substrate are placed in an inert gas environment at low pressure, such as less than 150 mTorr, and the boron diffuses into the substrate, causing a coating to form on the substrate.

The substrate may be steel, a nickel-based alloy, or a transition metal such as tungsten, tantalum, mirconium, molybdenum, titanium or a titanium alloy where the majority of the substrate, by weight, is titanium.

Amorphous boron used in the mixture may be between 91% and 95% by weight, and boron carbide may be between 2% and 7% by weight. In one such embodiment, amorphous boron is 95% and boron carbide is 4% (by weight).

In a further embodiment of the disclosed technology, a boronized substrate comprising a majority of titanium, by weight, and a boron coating at least 10 μm (micrometers) thick is disclosed, the boronized substrate having been boronized at a temperature above 800° C. for at least two hours and placed into a reduced pressure environment with a boron source. Such a boronized substrate may have a characteristic of zero galling at 17,000 psi and a boron coating chemically bound to the substrate.

BRIEF DESCRIPTION OF THE DRAWINGS

FIG. 11 shows an optical image of boronized tantalum produced using embodiments of the disclosed technology.

DETAILED DESCRIPTION OF EMBODIMENTS OF THE DISCLOSED TECHNOLOGY

Figure 1:
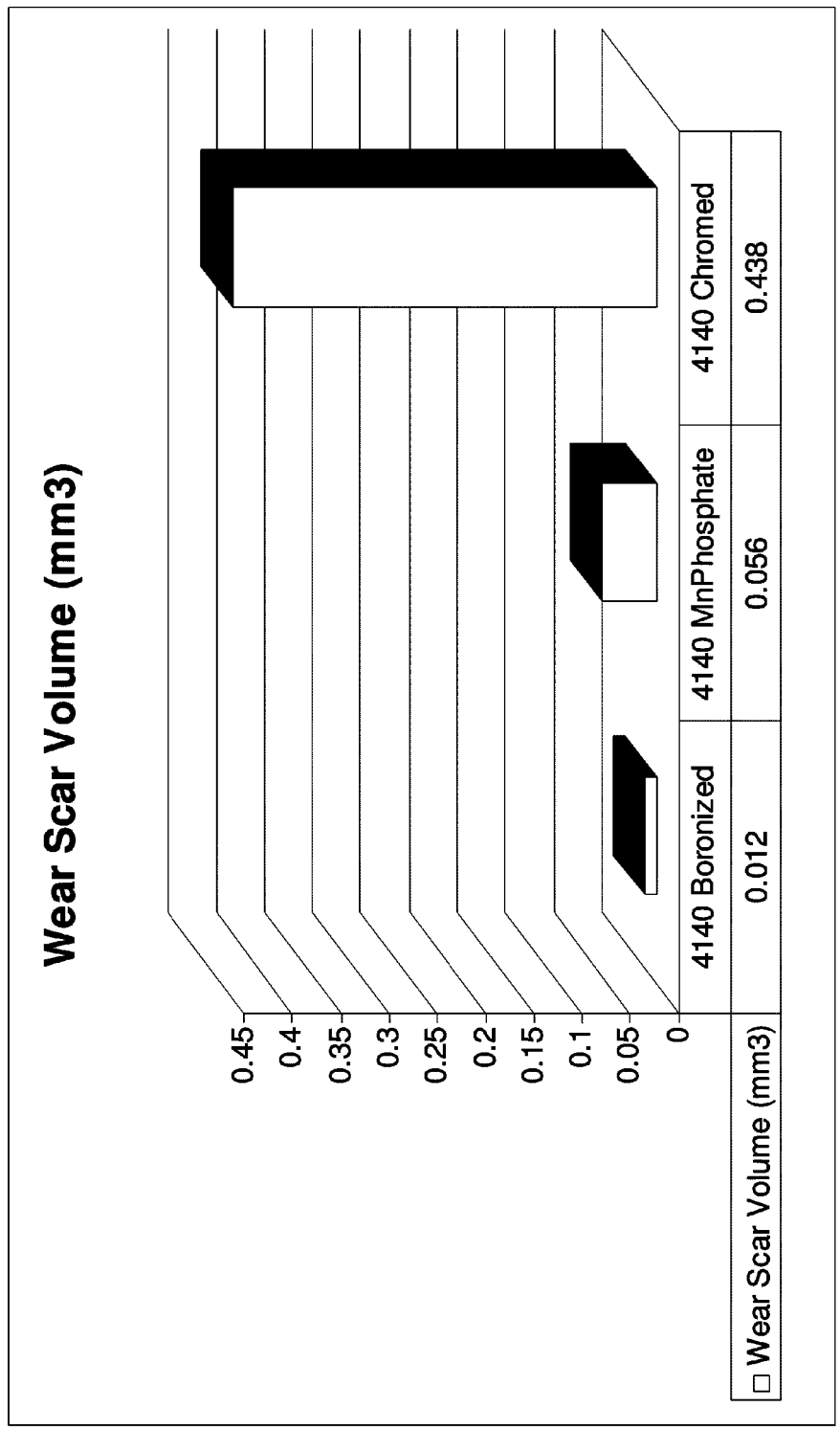
FIG. 1 is a chart of average block wear scar volume of steel produced, using embodiments of the disclosed technology compared to the prior art.

The boronization product and method of production thereof has improved wear and corrosion properties and is an oxidation-resistant coating with a low coefficient of friction and anti-galling performance. Embodiments of the disclosed technology comprise the use of a mixture of boron carbide ($B_4C$), aluminum oxide ($Al_2O_3$), zirconium oxide ($ZrO_2$), and potassium tetra fluoroborate ($KBF_4$). Table 1 shows the following ranges of these materials which may be used in embodiments of the disclosed technology.

TABLE 1

|  | Percent Range (wt %) |
| --- | --- |
| Boron Carbide | 90-94 |
| Aluminum Oxide | 3-5 |
| Zirconium Oxide | 1-3 |
| Potassium Fluoroborate | 1-2 |

In an embodiment of the mixture described with reference to Table 1, 92% boron carbide is used, 4% aluminum oxide, 3% zirconium oxide, and 1% potassium fluoroborate.

Powdered forms of boron carbide ($B_4C$), alumina ($Al_2O_3$), zirconium (IV) oxide ($ZrO_2$), and potassium tetrafluoroborate ($KBF_4$) are mixed together until a homogenous mixture is achieved. $B_4C$ is the boron yielding substance and made up the majority of the powder mixture; $KBF_4$ is an activator (other activators may be used), which is used to transport active boron atoms to the surface of the substrate material. $Al_2O_3$ and $ZrO_2$ may be used as the diluents for the mixture, and other diluents may be used.

In another embodiment of the disclosed technology, amorphous boron is mixed with boron carbide and potassium fluoroborate. As will be described in greater detail below, such a mixture allows for boronization of titanium and titanium alloys and composites, as well as any type of steel (plain, alloy, stainless), nickel-based alloys (Inconel), and transition metals (Ti, Zr, Hf, Cr, Mo, W, V, Ta, Nb). The ranges of these materials which may be mixed to produce a desired result is shown below in Table 2.

TABLE 2

|  | Percent Range (wt %) |
| --- | --- |
| Amorphous Boron | 91-95 |
| Boron Carbide | 2-7 |
| Potassium Fluoroborate | 1-2 |

In an embodiment of a mixture shown in Table 2, 95% amorphous boron, 4% $B_4C$, and 1% $KBF_4$ are mixed.

Amorphous boron (B) and boron carbide ($B_4C$) powders are used as boron source. Other boron sources may be used. Potassium fluoroborate ($KBF_4$) is the activator which transports active boron atoms to the surface of the substrate material; again, other activators may be used.

The mixture is then optionally placed in a container and heated, such as in a furnace or other heating device, to remove impurities and water and to better prepare it for a quality diffusion process. The heating process may take place, for example, at a temperature of 250° C. for 2 hrs. Heating time may vary between 2 and 24 hours. Intensity of heat may vary between 150° C. and 250° C. After the heating process is completed, the mixture is removed from the heat.

In a drying step, in an embodiment of the disclosed technology, a process crucible or other container is used whereby the container is filled partially (such as about halfway) and a dry powder mixture, comprising the compositions shown and/or described with reference to Table 1 or Table 2, is placed therein. Any suitable container may be used in the drying step.

In embodiments of the disclosed technology, the substrate to be boronized is cleaned with acetone for one minute to remove dust particles and oil from the surface. The substrate samples, coupons, or parts are then dried and ready to be thermo-chemically treated to make the boron coating.

When the metal component substrate (or substrates) to be boronized has an elongated shape, such a component may optimally be placed vertically (i.e., "standing up," such that a narrow end of the elongated component is at the bottom) on top of the mixture in the half-filled crucible. In the best mode of the disclosed technology, the metal component(s) should be placed so that they do not touch the crucible (container) bottom or walls. This is to allow all sides of the components to be exposed to the powder mixture.

The components are covered with powder mixture, such as by filling the crucible to the top.

The powder mixture, in embodiments of the disclosed technology, is then tightly packed in embodiments of the disclosed technology. This may be accomplished in a container with a secure lid placed on its top.

In embodiments of the disclosed technology, after packing, the mixture is placed in a reduced pressure environment ranging between 120-150 mTorr to purge the air and is heated again, such as to 250° C. for 2 hours or within the ranges specified previously.

In embodiments of the disclosed technology, after the mixture is dried (such as after 2 hours in a vacuum), a furnace or other source of heat is backfilled with argon or another inert gas and set to sustain positive gas flow which may be constant and may be at a positive furnace pressure such as 240 to 270 torr.

The boronizing process begins when the temperature is raised above 500° C. or up to 1200° C., and the filled container with components is kept at this heat range for 2 to 8 hours.

After the boronizing process, in an embodiment of the disclosed technology, the metal and compositions described with reference to Table 1 and Table 2 are surrounded with argon, or another inert gas, the heat source is turned off, and the compositions are allowed to cool to the ambient temperature. Diffusion saturation of the substrate by the boron takes place. If necessary, the heat treatment can be applied simultaneously with the process of diffusion saturation with boron.

When the container is sufficiently cool to handle, the crucible is taken out of the furnace (heat source) and the boronized components are removed, while making sure not to subject them to heavy surface impacts.

Cleaning the component surfaces of the substrate(s) may be accomplished by using compressed air, followed by placing them in a plastic container comprising alcohol, and then placing them in an ultrasonic vibrating cleaner for about one minute. In embodiments of the disclosed technology, the samples are cleaned with an agent such as alcohol in an ultrasonic cleaner for 1 minute. Then the samples are removed and dried.

The dried boronized components are ready for use, characterization, or storage. Microhardness of the boride layers ranges between HK 1600-3400 in the finished products. The resulting thickness of boron coating ranges between 7-300 μm. The phase composition of the obtained coating is a Metal$_x$B$_y$ boride.

Pack boronizing or solid state boronizing techniques are used in an embodiment of the disclosed technology. In this method, commercially available boronizing powders, such as boron carbide (B4C), the main source of boron, together with alumina (Al2O3) which act as inert diluents, and an activator compound such as potassium fluoroborate (KBF4) are used. The latter enhances the boronizing action of boron carbide via the formation of boron trifluoride (BF3). Therefore, the three primary constituents for pack boronizing, as used in embodiments of the disclosed technology are:

- boron source: boron carbide (B4C), ferroboron and amorphous boron
- activator: sodium tetrafluoroborate (NaBF4), potassium tetrafluoroborate (KBF4), ammonium tetrafluoroborate ((NH4)3BF4), ammonium chloride (NH4Cl), sodium carbonate (Na2CO3), barium fluoride (BaF2) and borax (Na2B4O7)
- diluent: alumina (Al2O3)

These constituent compounds can be comprised of various proportions depending upon the properties required; for example, the combination of 2% B4C (as boron donor)+5% KBF4 (as activator)+90% alumina (as diluent) is a typical mixture appropriate for steel substrates.

In the pack methodology, methods of the disclosed technology proceed as follows in an embodiment of the disclosed technology. First, the substrate being boronized is "packed" into a box-like container (similar to pack carburizing). Second, the surface of the substrate is then covered with a sufficient amount of boronizing powder (e.g., 10-20 mm). Next, an inert filler material (e.g., Al$_2$O$_3$) may be added. For the most effective processing environment, the processing container should be not greater than 60% of the area of the furnace chamber. Lastly, to avoid or minimize the adverse effect of oxygen on boronizing (oxidizing the powder mixture), the boronizing treatment should be performed under protective-gas atmosphere, such as argon (Ar), nitrogen (N$_2$), hydrogen (H$_2$) or mixture of argon with nitrogen and hydrogen (Ar—N$_2$—H$_2$).

Furnace temperatures typically range between 840 and 1050° C., with 900° C. a temperature used in embodiments of the disclosed technology. When the boronizing process is concluded, the containers are removed from the furnace chamber and air-cooled.

Pack boronizing requires minimal capital equipment, as compared to plasma-assisted and fluidized bed reactor boronizing (discussed below), and results in a homogeneous coating that has superior adhesion properties due to boron diffusion at the grain boundaries allowing new phases to form.

Any shape and size of parts can be boronized by using these techniques.

FIG. 1 is a chart of average block wear scar volume of steel produced using embodiments of the disclosed technology, compared to the prior art. Standard testing known in the art (ASTM G77 found at http://www.astm.org/Standards/G77.htm and hereby incorporated by reference) was performed on boronized steel and compared with hard chrome and phosphate coatings on steel. The average block wear scar volume (in cubic millimeters) Block-on-Ring Test was conducted. The higher wear resistance of boronized steel 4140 as compared with the hard chrome and phosphate is presented by the lowest wear scar volume of 0.012 cubic millimeters for boronized steel and 0.056 cubic millimeters and 0.438 cubic millimeters for phosphate and hard chrome, respectively.

Figure 2:
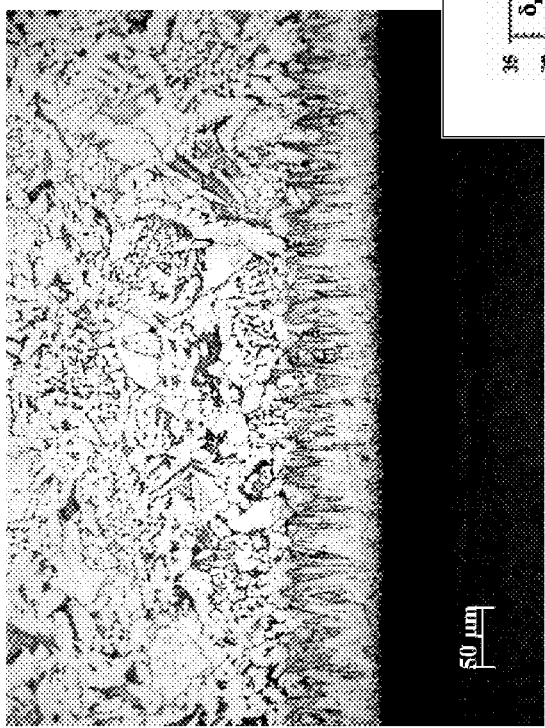
FIG. 2 shows a microstructure of boronized plain-carbon steel in an embodiment of the disclosed technology.

FIG. 2 shows a microstructure of boronized plain-carbon steel in an embodiment of the disclosed technology. The steel is AISI 1018, as is known in the art. (Further background data is being submitted with the Information Disclosure Statement of this patent). Such steel may be used in embodiments of the disclosed technology for pins, rods, shafts, spindles, sprocket assemblies and a wide variety of component parts. AISI 1018 steel is defined by the American Iron and Steel Institute and typically has the following properties, on average:

TABLE 3a

| Typical chemical composition of plain carbon steel AISI 1018 | Content, wt % |
|---|---|
| Iron | 98.81-99.26% |
| Manganese | 0.60-0.90% |
| Phosphorous | <0.040% |
| Sulfur | <0.050% |

TABLE 3b

| Mechanical properties of plain carbon steel AISI 1018 | |
|---|---|
| Hardness, Vickers | 149 |
| Ultimate tensile strength | 470 MPa |
| Yield tensile strength | 270 MPa |
| Modulus of elasticity | 205 GPa |
| Bulk modulus | 140 GPa |
| Poisson ratio | 0.29 |
| Elongation at break | 38% |
| Reduction of area | 62% |

Figure 3:
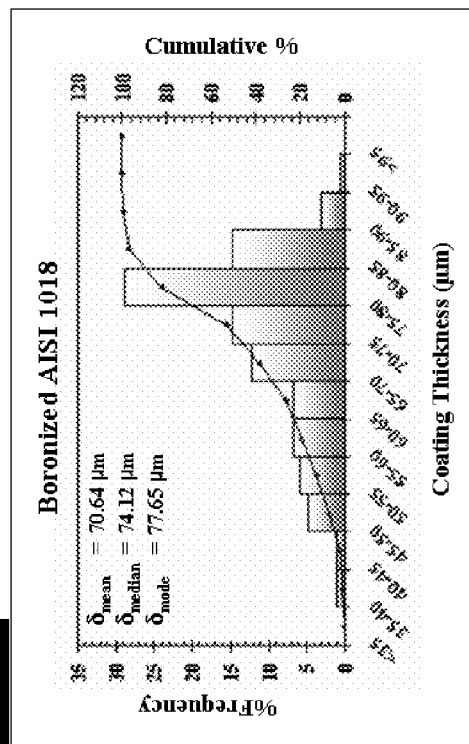
FIG. 3 shows the thickness distribution of boron coating on plain carbon steel (AISI 1018) in an embodiment of the disclosed technology.

FIG. 3 shows the thickness distribution of boron coating on AISI 1018 steel in an embodiment of the disclosed technology. The boron coating on plain carbon steel 1018 has needle-like structure (FIG. 2) which provides excellent adherence to the substrate. The diffusion of boron begins along the grain boundaries and, when the solubility limit is achieved, the diffusion continues through the grains. In this diffusion process, the thickness of the coating is controlled by the time and temperature used during formation of the coating. The chemical composition of the powder used may also be manipulated in embodiments of the disclosed technology to affect thickness of the coating. By controlling the powder mixture chemical composition, coatings with a desired phase compositions of $Fe_2B$ and $FeB$ result. Generally, a single phase of $Fe_2B$ is preferable, but when only wear resistance is needed (abrasion, adhesion, erosion), then the harder phase (FeB) is also desirable in controlled proportion. The measured boron coating thickness is 75-90 μm, as can be seen in FIG. 3 which represents the thickness coating distribution.

Figure 5:
FIG. 5 shows the microstructure of FIG. 4 at a higher magnification.
Figure 4:
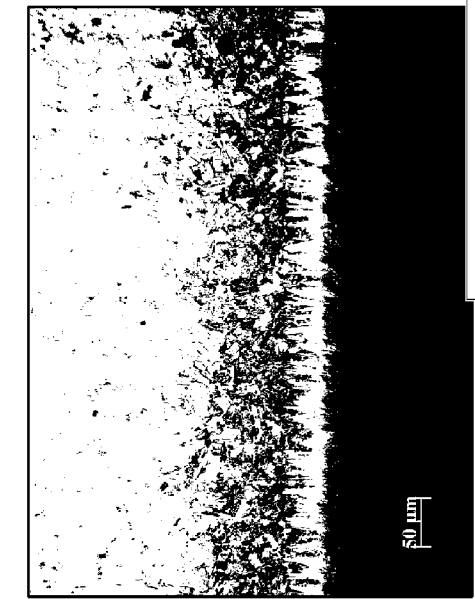
FIG. 4 shows the microstructure of boronized high strength steel (AISI 4340) in an embodiment of the disclosed technology.

FIG. 4 shows the microstructure of boronized high alloy steel (AISI 4340) in an embodiment of the disclosed technology. FIG. 5 shows the microstructure of FIG. 4 at a higher magnification. The chemical composition of AISI 4340 is shown below in Table 4a. Table 4b shows the mechanical properties of AISI 4340. Applications of AISI 4340 in embodiments of the disclosed technology are for structural use, such as an aircraft landing gear, power transmission gears, shafts, and other structural parts.

TABLE 4a

| Typical chemical composition of high strength alloy steel AISI 4340 | Content, wt. % |
| --- | --- |
| Carbon | 0.38-0.43% |
| Chromium | 0.7-0.9% |
| Nickel | 1.65-2% |
| Molybdenum | 0.2-0.3% |
| Manganese | 0.6-0.8% |
| Silicon | 0.15-0.30% |
| Phosphorous | <0.035% |
| Sulfur | <0.04% |
| Iron | balance |

TABLE 4b

| Mechanical properties of high strength alloy steel AISI 4340 | |
| --- | --- |
| Hardness, Vickers | 228 |
| Ultimate tensile strength | 740 MPa |
| Yield tensile strength | 470 MPa |
| Modulus of elasticity | 205 GPa |
| Bulk modulus | 140 GPa |
| Poisson ratio | 0.29 |
| Elongation at break | 22% |
| Reduction of area | 50% |

Figure 6:
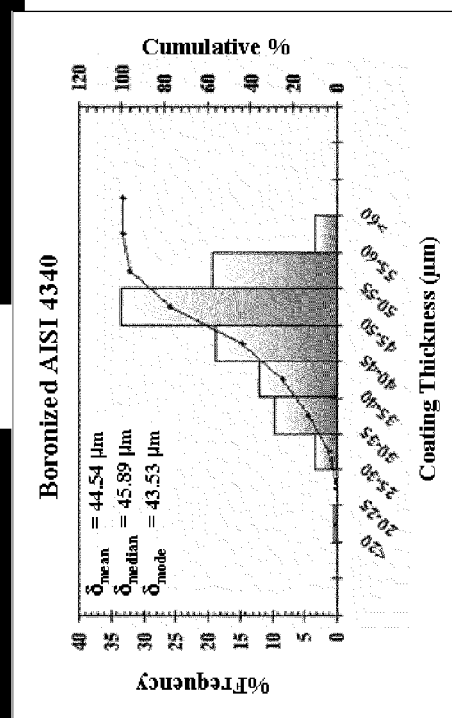
FIG. 6 is a chart of the thickness distribution of boron coating on high strength alloy steel (AISI 4340) in an embodiment of the disclosed technology.

FIG. 6 is a chart of the thickness distribution of boron coating on AISI 4340 steel. The microstructure of boron coating on high strength alloy steel 4340 is shown. The coating has the needle-like structure, and the measured thickness is between 45-60 μm.

Figure 8:
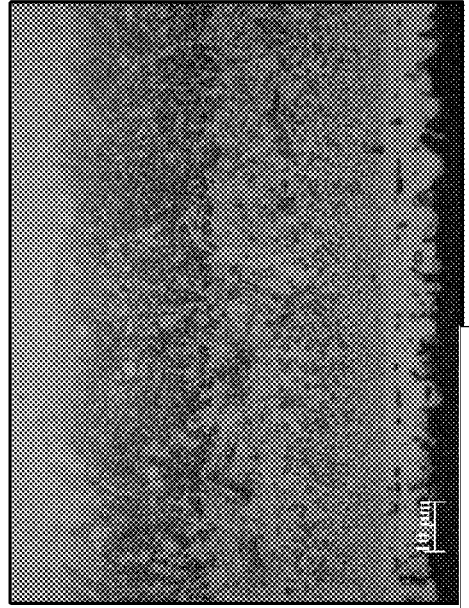
FIG. 8 shows the microstructure of FIG. 6 at greater magnification.
Figure 7:
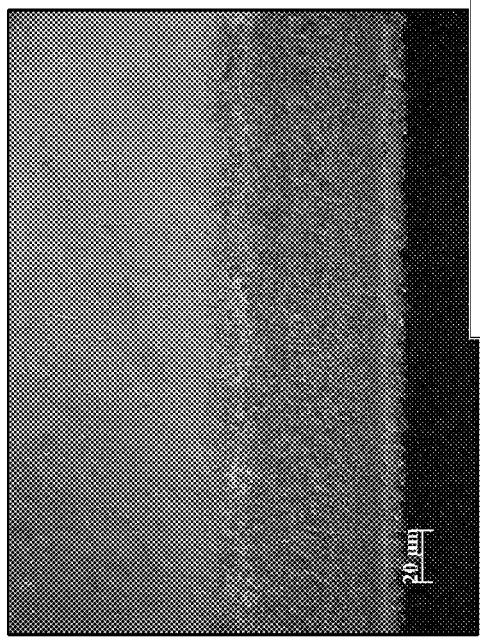
FIG. 7 shows microstructure of a boronized nickel-based alloy (Inconel 625) in an embodiment of the disclosed technology.

FIG. 7 shows microstructure of a boronized nickel-based alloy (Inconel 625) in an embodiment of the disclosed technology. FIG. 8 shows the microstructure of FIG. 7 at greater magnification. Tables 5a and 5b show the chemical composition and mechanical properties (respectively) of Inconel 625. In embodiments of the disclosed technology, Inconel 625 is used for aerospace devices, chemical processing, marine equipment, nuclear reactors, and pollution control equipment.

TABLE 5a

| Typical chemical composition of Inconel 625 | Content, wt % |
| --- | --- |
| Nickel | 58% min |
| Chromium | 20-23% |
| Molybdenum | 8-10% |
| Niobium + Tantalum | 3.15-4.15% |
| Iron | 5% max |

TABLE 5b

| Mechanical properties of Inconel 625 | |
| --- | --- |
| Tensile strength | 800-1580 MPa |
| Modulus of elasticity | 206 GPa |

Figure 9:
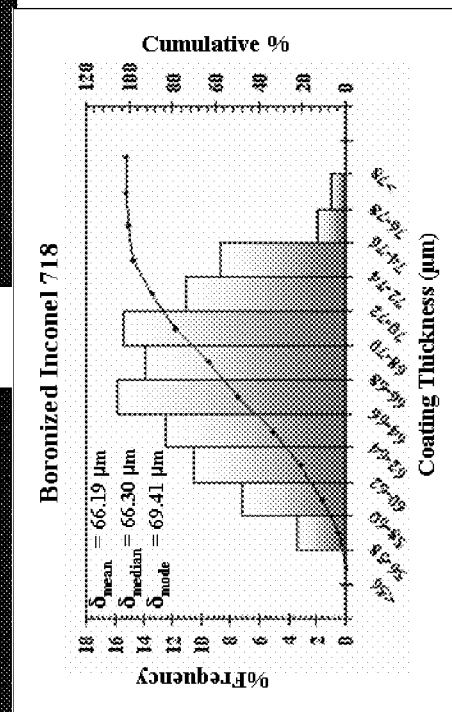
FIG. 9 shows a chart of the thickness distribution of boron coating on nickel-based alloy (Inconel 718) in an embodiment of the disclosed technology.

FIG. 9 shows a chart of the thickness distribution of boron coating on nickel-based alloy (Inconel 718) in an embodiment of the disclosed technology. Inconel 718, in embodiments of the disclosed technology, is used on gas turbines, rocket motors, spacecraft, nuclear reactors, and pumps. Tables 6a and 6b show typical chemical compositions and mechanical properties of Inconel 718. It should be understood that Inconel 718, as well other exemplary metals disclosed herein, is used as substrates which are boronized in embodiments of the disclosed technology.

TABLE 6a

| Typical chemical composition of Inconel 718 | Content |
| --- | --- |
| Nickel + Cobalt | 50-55% |
| Chromium | 17-21% |
| Molybdenum | 2.8-3.3% |
| Niobium + Tantalum | 4.75-5.5% |
| Titanium | 0.65-1.15% |
| Iron | balance |

TABLE 6b

| Mechanical Properties of Inconel 718 | |
| --- | --- |
| Tensile strength | 800-1500 MPa |
| Modulus of elasticity | 204 GPa |

Figure 10:
FIG. 10 shows a scanning electron microscope image of boronized titanium alloy in an embodiment of the disclosed technology.

FIG. 10 shows a scanning electron microscope image of boronized titanium alloy in an embodiment of the disclosed technology. The image is at 1200× magnification, and the titanium alloy sample was heated to 1100° C. for 8 hours. The SEM images confirm the results obtained by an optical microscopy. The needle-like structure of the hard titanium borides formed on the surface of boronized alloy can be seen with the SEM image in FIG. 10. The needles of titanium borides are thin, sharp, and penetrate in different directions into the titanium substrate. The needles can be observed as being deeper than the average size of the boron coatings known in the art. The deeper needle penetration, here, about 20 μm, creates a gradual transition from the surface to the core metal. This distribution of the sharp, hard, titanium boride phases results in excellent adhesion to the substrate material. The bonds are chemical, and the coating is scratch- and peel-resistant, which is one of its advantages over conventional coatings for titanium (i.e., thermal sprayed, physical or chemical vapor deposition, plasma sprayed). No other titanium alloy coating is known in the art with a thickness in the range of 10-20 μm and a hardness of at least HK 1900 (Knoop Hardness scale). A titanium alloy which may be used in embodiments of the disclosed technology, such as the substrate shown in FIG. 10 and described herein, is further described in Tables 7a and 7b. Such a titanium alloy may be used as a component for an airframe, fastener, blades disc, ring, vessel, case, hub, forging, and/or biomedical implant.

TABLE 7a

| Typical chemical composition of titanium alloy Ti—6Al—4V | Content, wt % |
|---|---|
| Titanium | 90% |
| Aluminum | 6% |
| Vanadium | 4% |
| Oxygen | max 0.2% |
| Iron | Max 0.25% |

TABLE 7b

| Mechanical properties of titanium alloy Ti—6Al—4V | |
|---|---|
| Hardness, Vickers | 396 |
| Ultimate tensile strength | 1170 MPa |
| Yield tensile strength | 1100 MPa |
| Modulus of elasticity | 114 GPa |
| Bulk modulus | 140 GPa |
| Poisson ratio | 0.33 |
| Elongation at break | 10% |
| Reduction of area | 50% |

Further, in galling resistance tests, the boronized samples were tested to the maximum stress limits available during testing. This was a stress of 17,000 psi (the max applied load (2500 pounds) divided by the cross-sectional area (0.1473 in^2). None of the specimens experienced galling, indicating that the coating is highly galling-resistant. This coating is, at the minimum, 10 times more galling-resistant than that of non-coated stainless steel. Simply stated, the galling resistance far exceeds the prior art, while the testing procedure was done in conformance with ASTM G196 "Standard Test Method for Galling Resistance of Material" which is incorporated by reference and described further herein below.

The data analysis regarding galling resistance could not be conducted according to the standard method, because no galling was seen on any specimen tested. The results of these tests indicate that the boron coating leads to substantial increases in the galling resistance. Galling resistance can be used as an initial indicator of fretting resistance. With this in mind, these results from galling testing indicate that the boron coating leads to substantial improvements in the fretting characteristics of the treated material. At the maximum stress of 17,000 psi, and confirmed by the testing center at Lafayette College in Easton, Pa., none of the specimens experienced galling, indicating that the coating is highly galling-resistant. This coating is, at the minimum, 10 times more galling-resistant than that of non-coated stainless steel.

FIG. 11 shows a microscope image of boronized tantalum produced using embodiments of the disclosed technology. Tantalum is one of many transition metals which may be boronized (coated with boron) in embodiments of the disclosed technology. In this particular example, during the heating stage described above, the tantalum substrate and boron-comprising coating were heated to 1000° C. for four hours. The microstructure of the coating appears as white layer, and it is well adhered to the substrate material as seen in the image.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

We claim:

1. A mixture used for boronizing a metal substrate, said mixture comprising:
    a boron source selected from the group consisting of boron carbide, ferroboron, amorphous boron, and a combination thereof, said boron source comprising at least 90%, by weight, of said mixture,
    between 1% and 3%, by weight, zirconium oxide,
    between 3% and 5%, by weight, of aluminum oxide, and
    between 1% and 2%, by weight, of an activator, wherein said activator is selected from the group consisting of sodium tetrafluoroborate, potassium tetrafluoroborate, ammonium tetrafluoroborate, ammonium chloride, sodium carbonate, barium fluoride and borax.

2. The mixture of claim 1, wherein said activator is potassium fluoroborate.

3. The mixture of claim 1, wherein said boron source is boron carbide and said weight of said boron carbide is 92%.

4. The mixture of claim 1, wherein said weight of aluminum oxide is 4%, said weight of zirconium oxide is 3%, and said weight of said activator is 1%.

5. The mixture of claim 1, wherein said mixture is kept above 250 degrees Celsius for at least two hours.

6. The mixture of claim 1, wherein said metal substrate comprises at least 50% titanium, by weight.

7. The mixture of claim 6, wherein said boron source is a combination of amorphous boron and boron carbide.

8. The mixture of claim 7, wherein boron carbide is between 2% and 7% of said mixture, by weight.

9. The mixture of claim 8, wherein said activator is 1% of said mixture, by weight.

10. A method of boronizing a metal substrate comprising, in order:
    providing a boronizinq mixture of claim 1;
    at least partially surrounding said metal substrate with said mixture;
    heating said mixture and said substrate above 500° C. for at least two hours;
    placing said mixture and said substrate in an inert gas environment less than 150mTorr; and
    and diffusing boron into said substrate.

11. The method of boronizing of claim 10, wherein said substrate is selected from the group consisting of steel, nickel-based alloys, and transition metals.

12. The method of claim 11, wherein said substrate comprises, by weight, a majority of titanium.

13. The method of claim 10, wherein boron carbide is between 2% and 7% by weight.

14. The method of claim 13, wherein boron carbide is 4% by weight.

15. The method of claim 10, further comprising a step of heating to at least 150° C. for at least two hours after said step of providing and before said step of surrounding.

16. The method of claim 10, wherein said step of surrounding further comprises tightly packing said substrate with said boronizing mixture.

* * * * *